United States Patent
Rosa

(10) Patent No.: US 6,210,576 B1
(45) Date of Patent: Apr. 3, 2001

(54) SYSTEM FOR CROSS-FLOW MEMBRANE FILTRATION

(75) Inventor: Giuliano Rosa, Wettingen (CH)

(73) Assignee: Bucher-Guyer AG, Niederweningen/Zurich (CH)

( * ) Notice: Subject to any disclaimer, the term of this patent is extended or adjusted under 35 U.S.C. 154(b) by 0 days.

(21) Appl. No.: 09/117,431
(22) PCT Filed: Nov. 26, 1997
(86) PCT No.: PCT/CH97/00443
§ 371 Date: Jul. 30, 1998
§ 102(e) Date: Jul. 30, 1998
(87) PCT Pub. No.: WO98/24538
PCT Pub. Date: Jun. 11, 1998

(30) Foreign Application Priority Data

Dec. 5, 1996 (CH) .................................... 2981/96

(51) Int. Cl.[7] .................................... B01D 61/14
(52) U.S. Cl. .............. 210/321.78; 210/321.87; 210/323.2; 210/335; 210/340
(58) Field of Search .................... 210/94, 137, 326.6, 210/321.78, 321.79, 321.8, 321.88, 321.89, 321.9, 323.2, 339, 247, 500.23, 335, 340, 650; 96/7, 8, 29

(56) References Cited

U.S. PATENT DOCUMENTS

| 3,446,359 | 5/1969 | Loeb et al. ........................... 210/490 |
| 3,708,069 | * 1/1973 | Clark ................................. 210/321.6 |
| 3,734,297 | * 5/1973 | Windle ............................... 210/321.6 |
| 4,016,078 | * 4/1977 | Clark .................................... 210/339 |
| 4,080,296 | * 3/1978 | Clark ................................. 210/323.2 |
| 4,732,676 | * 3/1988 | Molnar et al. .................... 210/232.2 |
| 4,988,445 | * 1/1991 | Fulk ..................................... 210/335 |
| 5,034,125 | * 7/1991 | Karbachsch et al. ............. 210/323.2 |
| 5,137,631 | * 8/1992 | Eckman et al. ................. 210/321.79 |
| 5,141,640 | * 8/1992 | Sasajima et al. ............... 210/321.79 |
| 5,470,469 | * 11/1995 | Eckman .......................... 210/321.85 |

FOREIGN PATENT DOCUMENTS

| 75 05 931 | 2/1975 | (DE) . |
| 0 039 583 | 11/1981 | (EP) . |
| 0 065 070 | 11/1982 | (EP) . |
| 1 465 971 | 3/1977 | (GB) . |
| 96/41676 | 12/1996 | (WO) . |

* cited by examiner

Primary Examiner—Joseph W. Drodge
(74) Attorney, Agent, or Firm—Burns, Doane, Swecker & Mathis

(57) ABSTRACT

The system comprises a number of membrane modules (21), each one containing one or a bundle of several membrane tubules. The membrane modules (21) are connected on behind the other in series (passes) (43 to 48), which lie in horizontal planes. Several series (passes) (43 to 48) lie vertically on top of each other. Vertically extending collection lines (261, 49, 271) are arranged for the supply to, or respectively the removal of the medium to be filtered from the series (passes) (43 to 48). The arrangement offers a particularly simple assembly.

19 Claims, 6 Drawing Sheets

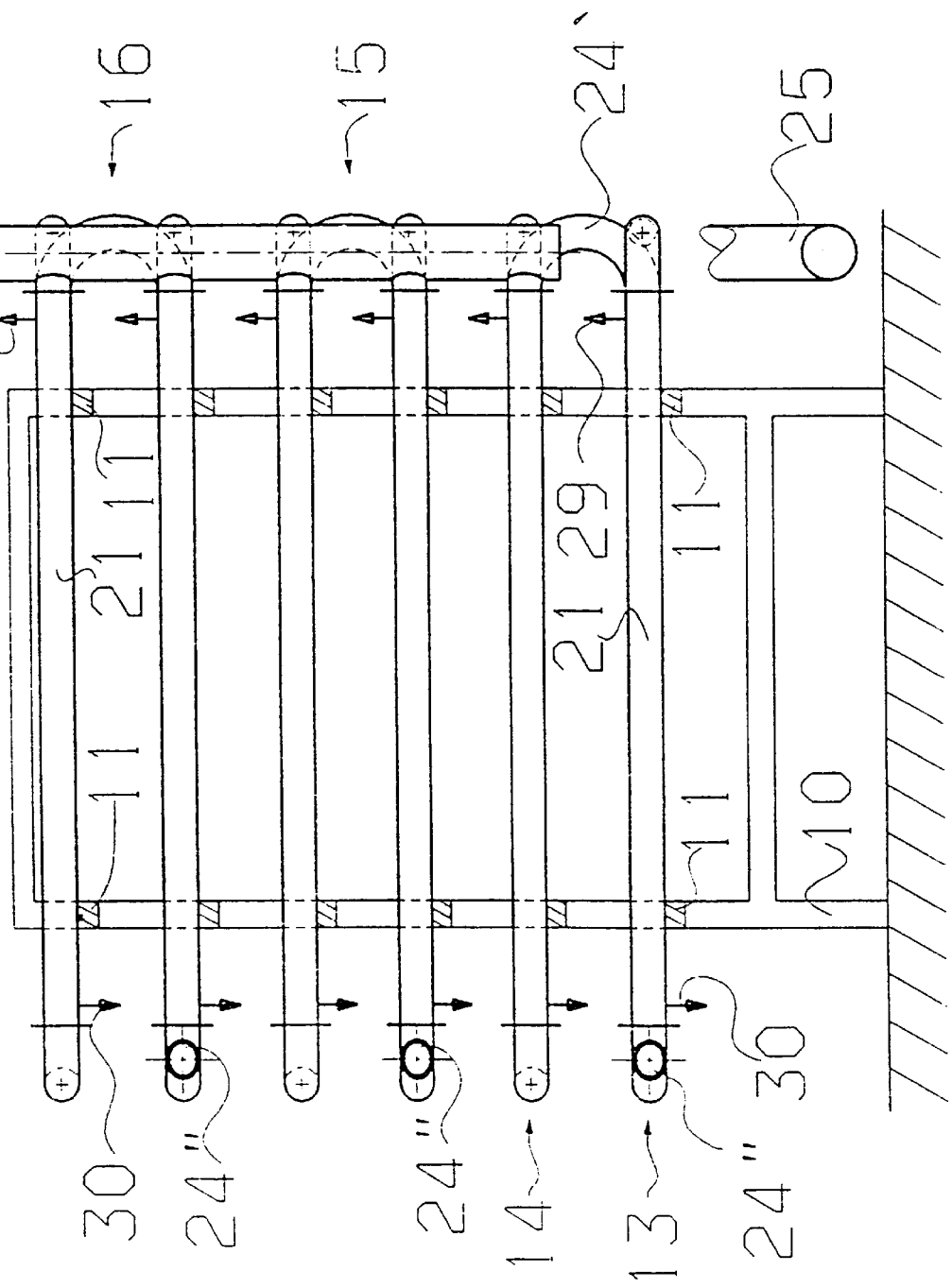

SYSTEM FOR CROSS-FLOW MEMBRANE FILTRATION

This Application is a 371 of PCT/CH97/00443 filed on Nov. 26, 1997.

The invention relates to a system for cross-flow membrane filtration, having a number of membrane modules, wherein the membrane modules, lying one behind the other, are connected with each other in series (passes) for the flow-through of the retentate, and the series are parallel connected with collection lines for supplying and removing the retentate.

DESCRIPTION OF THE PRIOR ART

Membrane modules of this type are known as components of cross-flow filtration installations. Cross-flow filtration is a pressure filtration. Here, the product to be filtered flows at a predetermined speed crosswise to the direction of passage and along the surface of the filter or filtration membrane. The cross flow prevents the deposition of solids on the surfaces of the filters to a large extent and therefore allows an extended operating time without plugging of the filters.

Membrane modules of this type are often designed as so-called tube or capillary modules, wherein one or several capillary tubules or tubes are combined in a bundle-shaped unit. Depending on the type, the membrane here is attached to the inner wall or the outer wall of the tubes. In one embodiment, nineteen membrane tubules of an interior diameter of ½ inch are combined into a bundle in a module. The retentate flows simultaneously and parallel through these nineteen tubules at a predetermined pressure. After passage through the filter membranes, the permeate flows off via two connections on each membrane module.

A known system for membrane filtration, having a number of such membrane modules 1, is shown in a lateral view in FIG. 1a, and in FIG. 1b in partial section along the line B—B in FIG. 1a. In this case the membrane modules 1 are arranged one behind the other in five series 3 (passes) on supports 2. Seven membrane modules 1, lying in a vertical plane one above the other, are connected in a series by U-shaped elbows 4 in each pass 3. The medium to be filtered is pumped in as retentate at a connector 5 in each pass 3, and leaves the pass 3 at a connector 6 of the topmost membrane module 1. Supply and removal of the retentate at the connectors 5 and 6 of the five passes 3 takes place via horizontally extending collection lines, not represented.

Collection lines 8, shown in FIG. 1b, are also provided for removing the permeate from connectors 7 of the membrane module 1. A problem with these known systems resides in that on the one hand the U-shaped elbows 4 determine the vertical distances between the membrane modules 1, but on the other hand can only be efficiently produced with tolerances of the distances of several millimeters between their connectors. Therefore the distances between the membrane modules 1 do not match the distances between the support 2. A large production outlay results because of adjustment work on the frame of the supports 2.

FIG. 2 illustrates a known solution of this matching problem. The distance tolerances between the membrane modules 1 and the supports 2 are evened out by placing the membrane modules 1 on flexible compensation brackets 9. The production, mounting and adaptation of the compensation brackets 9 again results in a large labor outlay. Furthermore, the seating of the membrane modules 1 is not always secure. There is a danger of breakage in connection with modules made of plastic or ceramic material. If the distances between the supports 2 with the compensation brackets 9 are not sufficiently accurately matched, or if the axes of the modules 1 are not sufficiently parallel, leaking flange connections and damage to their seals can result. This even more so, since the number of the flange connections to be made is mostly greater than 160.

SUMMARY OF THE INVENTION

It is therefore the object of the invention to remedy the stated problems to a great extent.

In accordance with the invention, this object is attained in connection with a system of the type mentioned at the outset in that the membrane modules of each series (pass) are arranged lying horizontally next to each other in at least one plane.

The system is advantageously designed in such a way that the horizontal planes of several series (passes) of membrane modules are arranged vertically above each other, and that the collection lines for the supply and removal of the retentate of the series (passes) are vertically oriented.

In the course of this, the characteristic may arise that at least one series (pass) of membrane modules is arranged in two planes located vertically above each other, and that the connection from the lower plane to the upper plane between two membrane modules takes place by means of an obliquely extending U-shaped elbow.

In a preferred embodiment the collection lines for the supply and removal of the retentate have removal openings for collected solids (sludge).

Additional variants of the system are characterized in the claims.

In comparison with known arrangements with series of membrane modules which are arranged vertically, the system in accordance with the invention offers the additional advantage that it is possible to increase the number of modules in each series (pass) without needing additional support arms, as long as the simple support frame already has a sufficient number of reserve spaces for such additional modules.

BRIEF DESCRIPTION OF THE DRAWINGS

Exemplary embodiments of the invention are explained in more detail in the following description and in the figures in the drawings. Shown are in.

DETAILED DESCRIPTION OF THE INVENTION

Figure 1A:
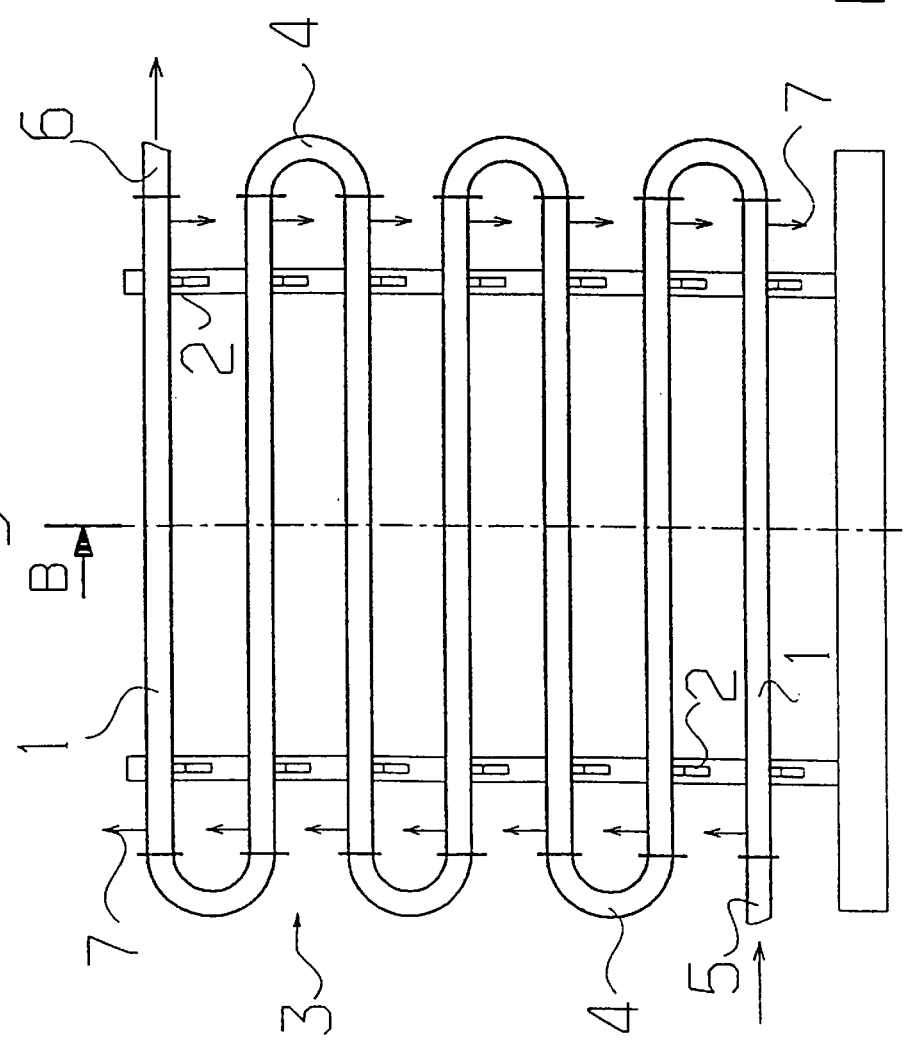
FIG. 1a and FIG. 1b, a known system for membrane filtration in a lateral view and in partial section, FIG. 2, a known seating of membrane modules on flexible compensation brackets, FIG. 3, a front view of a system in accordance with the invention for membrane filtering with membrane modules arranged horizontally next to each other, FIG. 4, a partial section through the system of FIG. 3 along the line A—A, FIG. 5, the seating of a membrane module on a support in accordance with FIG. 4 in detail, FIG. 6, a front view of a further system in accordance with the invention with two groups of series (passes) of membrane modules connected by a collection line, and FIGS. 7a, 7b, 7c, symbolized representations of arrangements in accordance with the invention of membrane modules for membrane filtration.
Figure 1B:
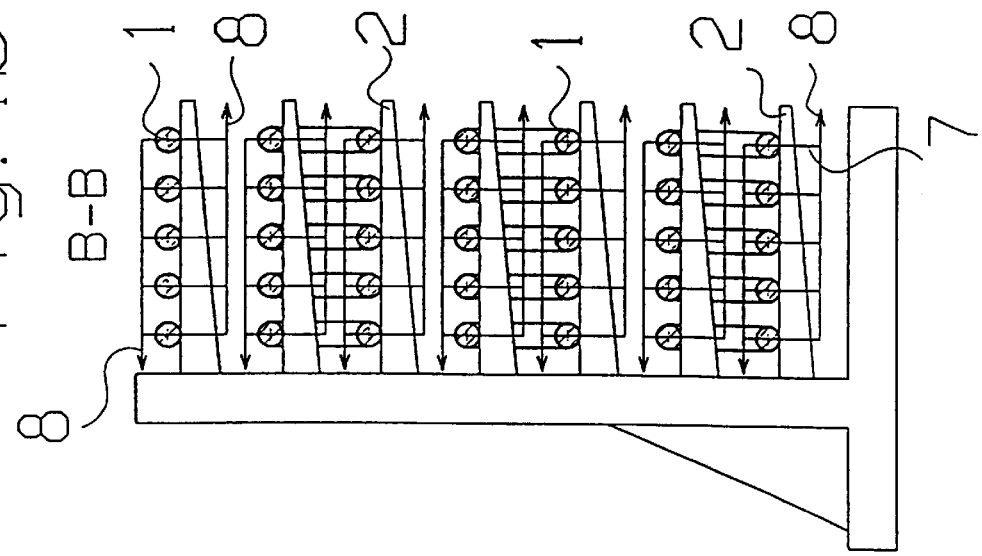
Figure 2:
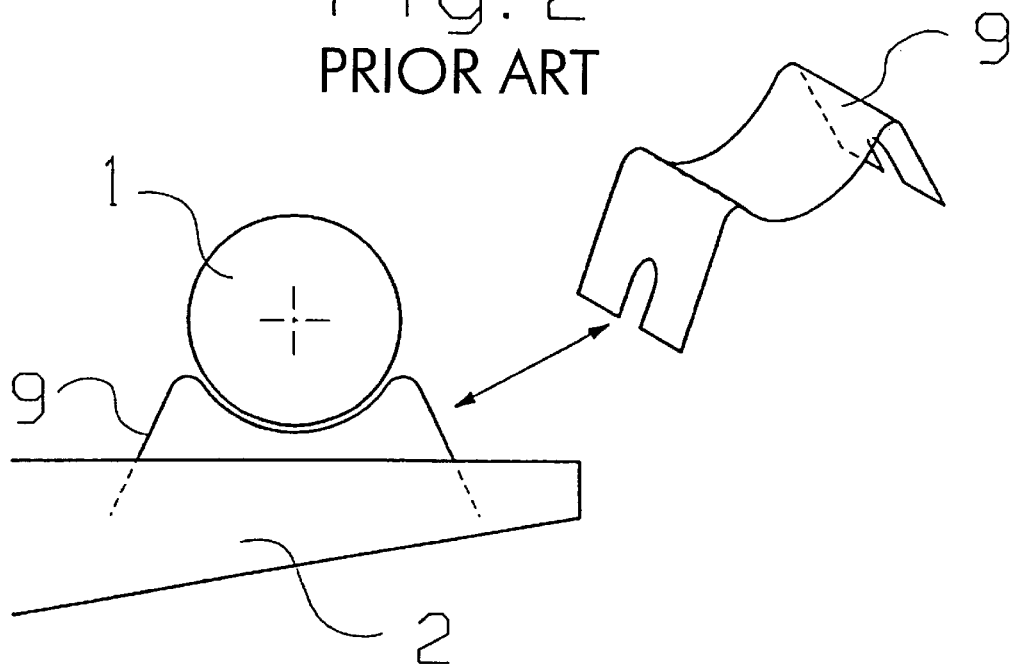
Figure 5:
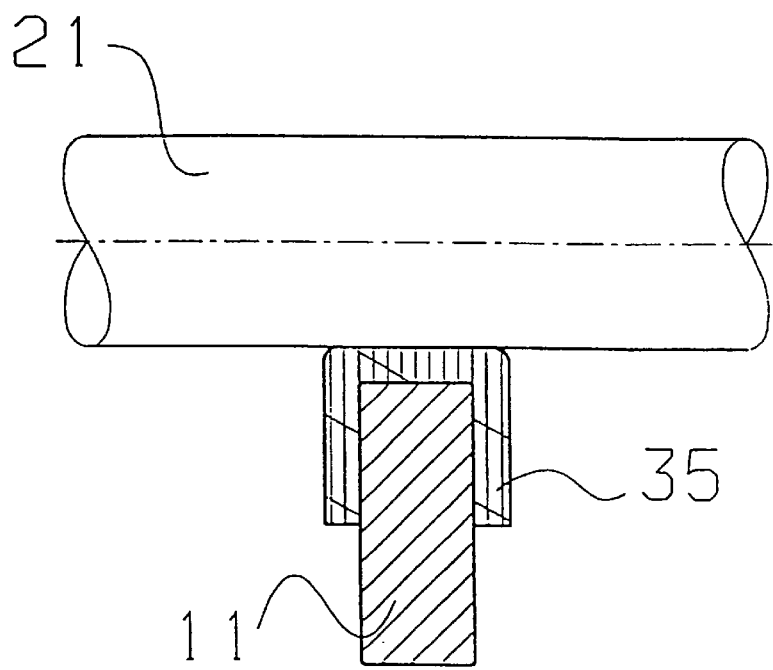
Figure 3:
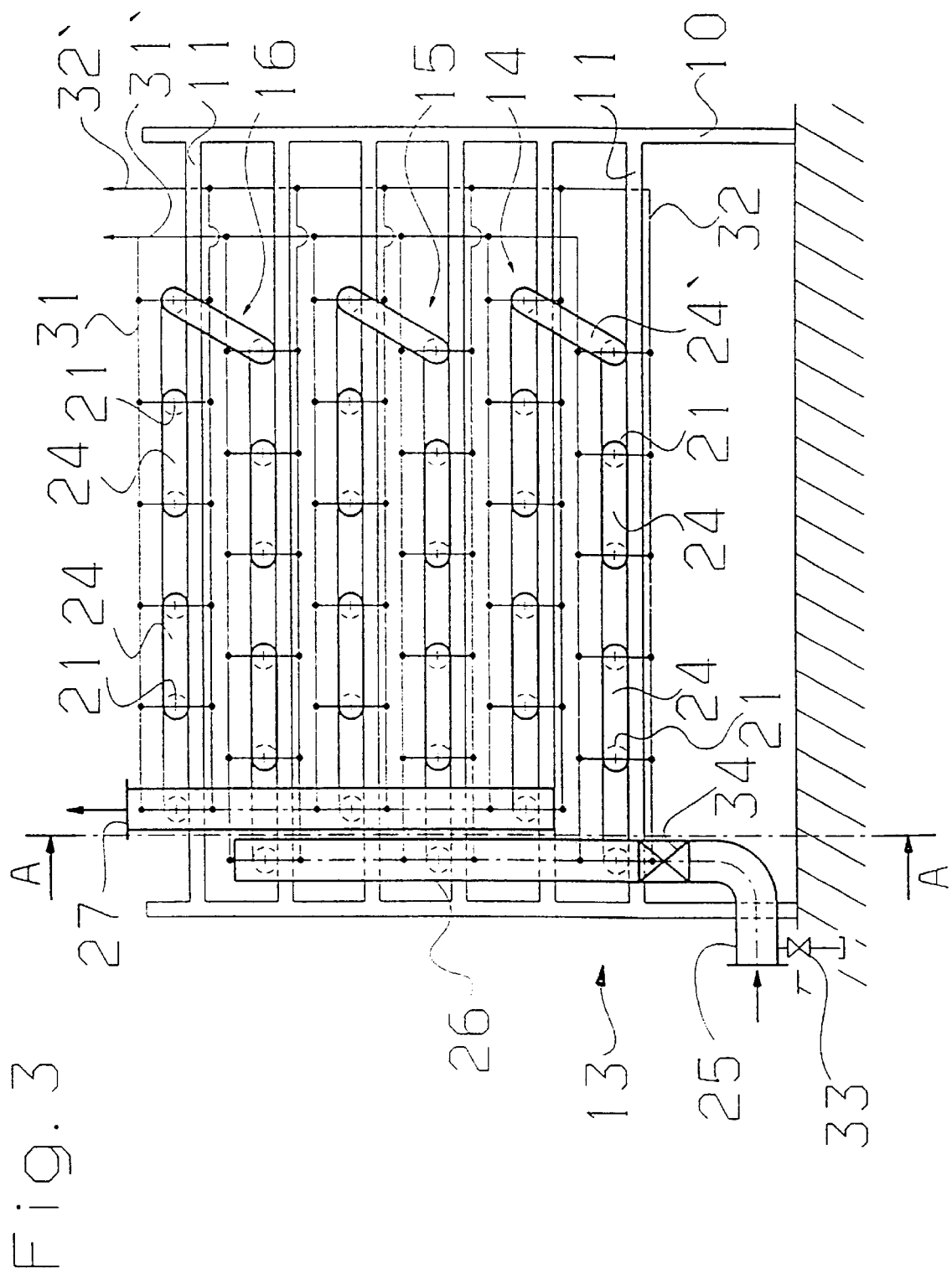

FIG. 3 and FIG. 4 represent a front, or respectively a lateral view in partial section along the line A—A in FIG. 3 of a system in accordance with the invention. A support frame 10 has six pairs of support rods 11, which are arranged parallel with each other in six horizontal planes and vertically on top of each other. A series (pass) 13, 14, 15, 16 of parallel, tube-shaped membrane modules 21 rests horizontally and transversely on each pair of support rods 11, similar to the series (pass) 3, which extends vertically in FIG. 1a of the known system. FIG. 5 shows in detail a membrane module 21 resting on a support rod 11. In contrast to the known placement in accordance with FIG. 2 with compensation brackets 9, which are adjustable in height, in FIG. 5 a simple resilient intermediate layer 35 between the membrane module 21 and the support rod 11 is sufficient.

As shown in FIG. 3, the membrane modules 21 are connected in series (passes) 13, 14 at their ends by U-shaped elbows 24. The lowermost series 13 is connected with the series 14 lying above it by an obliquely extending U-shaped elbow 24' so that a whole series (pass) results, whose elements 13, 14 are arranged in two planes lying vertically above each other. The planes of the three obliquely extending U-shaped elbows 24' in the passes 13, 14, 15 and 16 form an angle of 60° with the horizontal plane. With a particularly compact construction these angles can also be less than 60°.

As can be seen in FIG. 3 and FIG. 4, the represented system comprises a total of three of such whole series (passes) 13, 14, 15 and 16 with respectively two elements. The medium to be filtered, preferably fruit juice, enters via a connector 25 and a vertical collection line 26 into the respective first membrane modules 21 connected therewith of the lower elements 13 of the series (passes) 13, 14, 15, 16. After passing through these passes, the medium, in the form of a retentate, gets from the respective last membrane module 21 of the upper partial series 14 into a vertical collection line 27 connected therewith for the removal of the retentate. At its input at the bottom, the collection line 26 has a static mixer 34 to assure an even distribution of solids in the retentate flow.

In the partial section A—A in FIG. 4, the vertical collection lines 26, 27 are placed one behind the other. So that in FIG. 4 the collection line 26 does not hide the collection line 27 located directly behind it, only the connector 25 of the latter is represented here. As shown in FIG. 3, the section plane A—A extends perpendicularly in respect to the drawing plane between the collection lines 26, 27 and intersects the first U-shaped elbows 24 of the three lower elements 13 of the series in front of their centers. The intersections with these U-shaped elbows 24 have been identified by 24" in FIG. 4.

Each membrane module 21, known per se, has two connecting openings for the removal of the permeate, which are indicated by the arrows 29, 30 in FIG. 4. The connecting openings 29, which are located at the front of the modules 21 in the representation of FIG. 3, lead to permeate collection lines 31. The connecting openings 30, which are located at the rear, supply permeate collection lines 32. The six permeate collection lines 31 lead into a further collection line 31', the six permeate collection lines 32 into a further collection line 321, both of which leave the system.

The described horizontal position of the membrane modules 21 obviously requires a more or less vertical position of the retentate collection lines 26, 27. In case of interruptions in the retentate flow it is possible for solids from the retentate to become unevenly deposited in collection lines of such orientation and to plug up individual membrane tubules in the modules 21 when the installation is restarted. This disadvantage is prevented in accordance with FIG. 3 by drain valves 33, such as indicated at the lower end of the retentate collection line 26. Tests have shown that, following an interruption in the retentate flow, restarting is possible without problems by draining or pumping out deposited solid particles. In this way it was possible to overcome a known prejudice against a horizontal position of membrane modules.

Figure 6:
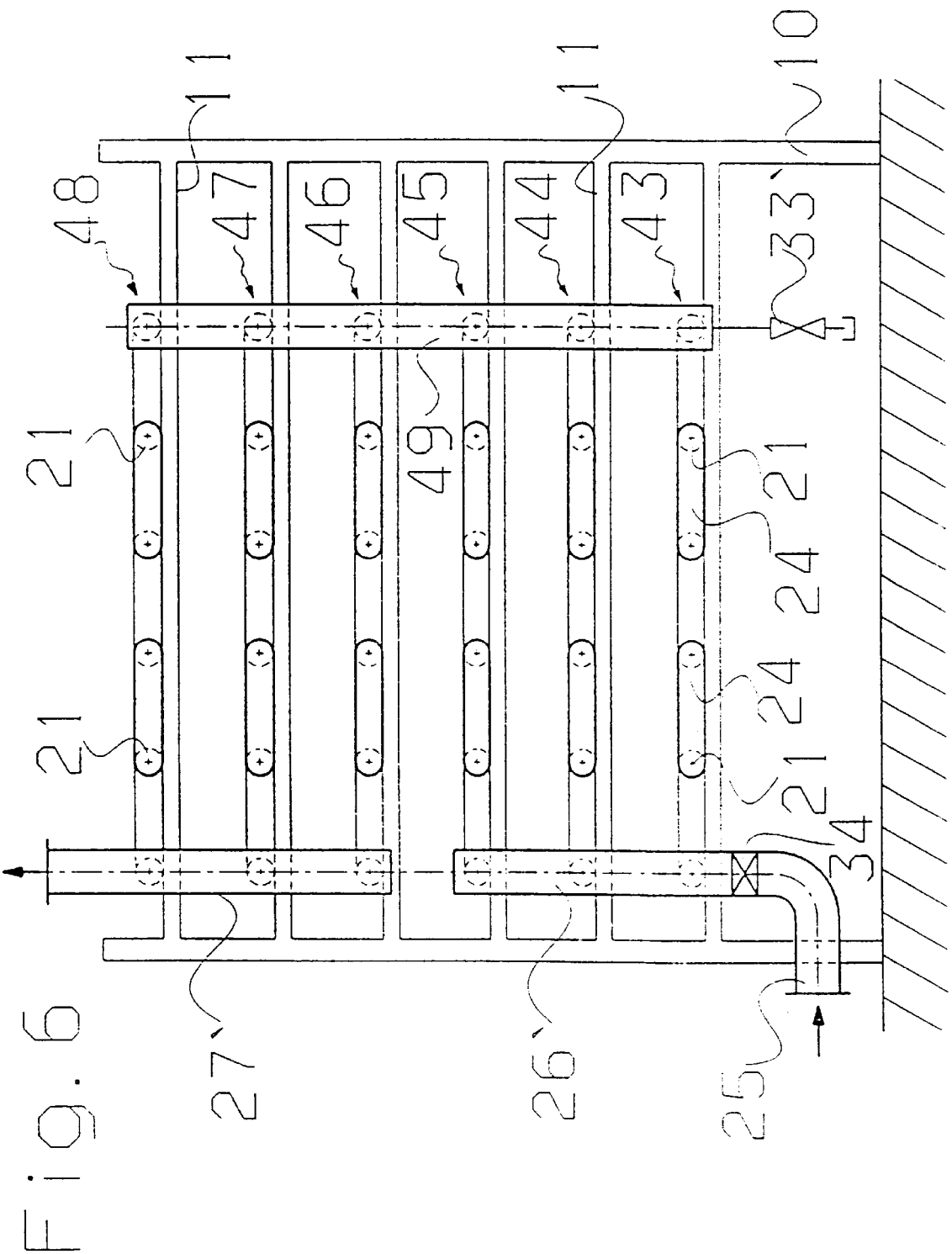

In a variant of a system for membrane filtration in accordance with FIG. 6, components which have already been described in FIG. 3 have the same reference numerals. In accordance with FIG. 6, six series (passes) 43 to 48 of membrane modules 21 are horizontally seated on the pairs of support rods 11 of the support frame 10. Here the membrane modules 21 are connected in series by U-shaped elbows 24, the same as in the system in accordance with FIG. 3. From the retentate connector 25, the passes 43, 44, 4S are charged with retentate via a supply collection line 26'. After its passage, the retentate is removed from the passes 43 to 45 through a further collection line 49, and at the same time supplied to the passes 46 to 48. Finally, a collection line 27' for removing the retentate from the passes 46 to 48 is provided. In the system in accordance with FIG. 6, collection lines for removing the permeate correspond to those in accordance with FIG. 3, but they have not been represented in FIG. 6.

The parallel supply of pipelines with liquids containing solids, such as fruit juice, or waste water in the chemical, pharmaceutical, food processing, or waste water processing fields, etc. via retentate collection lines 26, 27 in accordance with FIG. 3, or 26', 27', 49 in accordance with FIG. 6, are known to pose certain problems regarding the assurance of even in- and outflow in all connected parallel lines. However, it has been shown that with the described preferred embodiments of the system for membrane filtration, the flow problems can be avoided by the use of guide elements, known per se and not represented, in the collection lines for the retentate. This all the more, if static mixers 34 in accordance with FIGS. 3 and 6 are used for homogenizing the distribution of solids in the retentate.

Figure 7A:
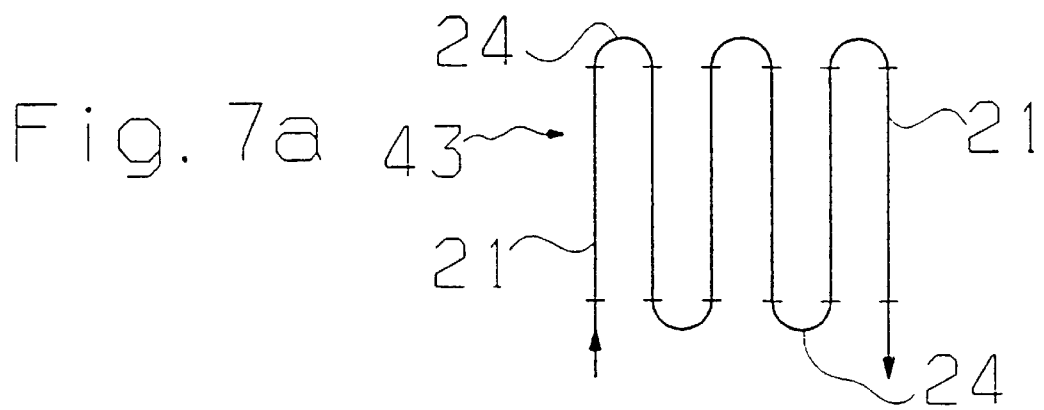
Figure 7B:
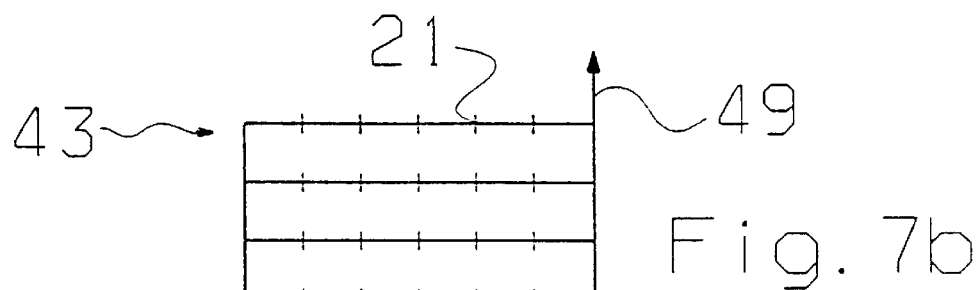
Figure 7C:
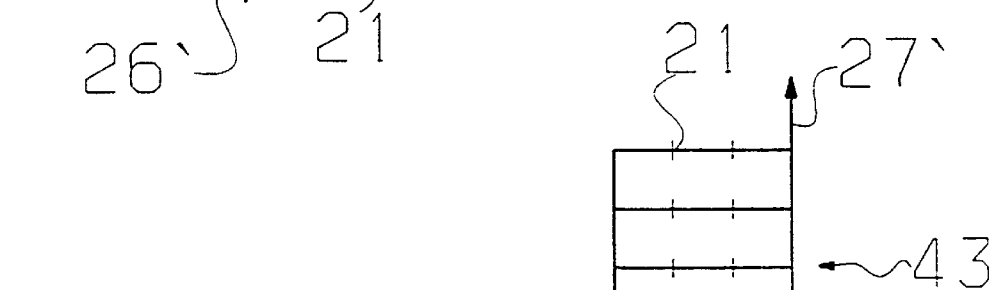

The described exemplary embodiments in accordance with FIGS. 3 to 6 include all series (passes) of membrane modules lying horizontally next to each other. FIG. 7a shows a symbolized top view of such a pass 43 with six membrane modules 21, which are connected by five U-shaped elbows 24. A symbolized front view of five such passes 43 of respectively seven membrane modules 21 is represented in FIG. 7b. The horizontal planes of the passes 43 are arranged vertically above one another and are supplied by two vertical collection lines 261, 49 for the retentate. FIG. 7c represents a symbolized front view of a system with ten series 43 of membrane modules 21, which are supplied by three vertical collection lines 26', 49, 27'. If the five upper passes 43 are arranged vertically above the five lower passes 43, the already described system in accordance with FIG. 6 results.

A multitude of arrangements of the system for membrane filtration results for one skilled in the art, none of which depart from the scope of the attached claims.

What is claimed is:

1. A system for cross-flow membrane filtration, having a number of membrane modules each comprising
    (a) at least one membrane tube, whose wall has the function of separating permeate from retentate, as well as
    (b) a tube-shaped module housing for receiving the membrane tube and for removing the filtrate as the permeate;

wherein each membrane module has respectively
- (c) one connection for the supply thereto and the removal therefrom of the retentate, as well as
- (d) at least one connecting opening in the tube-shaped module housing for the removal of the permeate; and wherein the membrane modules are arranged in groups in each of which the membrane modules lie one behind the other and are connected with each other in series for the sequential passage of retentate through the membrane modules of the group; and wherein said groups of membrane modules are connected in parallel between collection lines for supplying and removing the retentate; said system being characterized in that the membrane modules connected together in series in each of said groups are arranged lying horizontally next to each other in at least one plane and in that the horizontal planes of different series-connected groups of membrane modules are arranged vertically above each other.

2. The system in accordance with claim 1, characterized in that the collection lines for supplying the retentate to and removing the retentate from the groups extend vertically.

3. The system in accordance with claim 2, characterized in that at least one group of series-connected membrane modules is arranged in two planes, one of which planes is located vertically above the other plane, and in that a connection from the membrane modules in the lower plane to the membrane modules in the upper plane is provided by an obliquely extending U-shaped elbow.

4. The system in accordance with claim 3, characterized in that the plane of the obliquely extending U-shaped elbow forms an angle of maximally 60 degrees with a horizontal plane.

5. The system in accordance with claim 2, characterized in that the groups of membrane modules arranged vertically in several horizontal planes on top of each other are divided into a plurality of sets and the vertically extending collection lines for removing the retentate from one of said sets are used for supplying the retentate to another of said sets.

6. The system in accordance with claim 2, characterized in that the collection lines for the supply and the removal of the retentate have draining devices for collected solids (sludge).

7. The system in accordance with claim 1, characterized in that the collection lines for the supply and removal of the retentate have guide elements for assuring equal inflow and outflow for all of the groups of membrane modules connected to the respective collection lines.

8. The system in accordance with claim 2, characterized in that the collection lines for the supply and removal of the retentate have static mixers for assuring an even distribution of solids in the retentate flow.

9. The system in accordance with claim 1, characterized by support means (11), on which the membrane modules (21) rest directly.

10. The system in accordance with claim 1, characterized by support means (11), on which the membrane modules (21) rest on elastic intermediate layers (35).

11. The system in accordance with claim 1, characterized by support means (11) for the membrane modules (21), which have free reserve places for further groups of membrane modules.

12. Apparatus for cross-flow membrane filtration comprising a plurality of horizontally extending tubular membrane modules each having an inlet end for receiving retentate and an outlet end for discharging retentate, said tubular membrane modules being arranged in horizontally extending groups each including at least five of said tubular membrane modules disposed substantially in a common plane, said groups of at least five tubular membrane modules being vertically spaced apart from one another, a plurality of horizontally extending U-shaped connectors attached to the ends of adjacent tubular membrane modules to provide for sequential retentate flow through the at least five membrane modules of each group in series, and vertically extending lines for transferring retentate to and from said horizontally extending groups.

13. Apparatus according to claim 12, including at least five of said horizontally extending membrane module groups.

14. Apparatus according to claim 13, comprising a frame having, at each of at least five vertically spaced apart levels, two laterally spaced apart supports, with the supports at each level extending generally parallel to each other for supporting the tubular membrane modules of the respective group in generally the same horizontal plane.

15. Apparatus for cross-flow membrane filtration of fruit juice containing solids, comprising
- a frame provided, at each of a plurality of vertically spaced apart levels, with membrane module supports, located generally in the same horizontal plane,
- a plurality of horizontally extending tubular membrane modules each having an inlet end for receiving retentate and an outlet end for discharging retentate, said tubular membrane modules being disposed on said supports in vertically spaced-apart horizontally extending groups each including a plurality of tubular membrane modules connected together in series for sequential flow of retentate through the membrane modules of the group, and
- supply and discharge lines connected to tubular membrane modules in each group for transferring retentate to and from the groups of membrane modules.

16. Apparatus for cross-flow membrane filtration according to claim 15, wherein said supply and discharge lines each extend vertically across a plurality of said levels and are connected to membrane modulues in a pluarlity of said groups to cause retentate to flow through such groups in parallel from the supply line to the discharge line.

17. Apparatus for cross-flow membrane filtration according to claim 16, wherein said vertically extending supply and discharge lines are provided with drainage devices for the removal of collected solids.

18. Apparatus for cross-flow membrane filtration according to claim 16, wherein said vertically extending supply and discharge lines are provided with guide elements for assuring equal inflow and outflow for all of the groups of membrane modules connected to said supply and discharge lines.

19. Apparatus for cross-flow membrane filtration according to claim 16, wherein said vertically extending supply and discharge lines are provided with static mixers for assuring an even distribution of solids in the retentate flow.

* * * * *